J. T. GILMER.
METHOD OF TREATING TREES FOR EXTRACTING SAP.
APPLICATION FILED NOV. 19, 1910.
1,012,541. Patented Dec. 19, 1911.
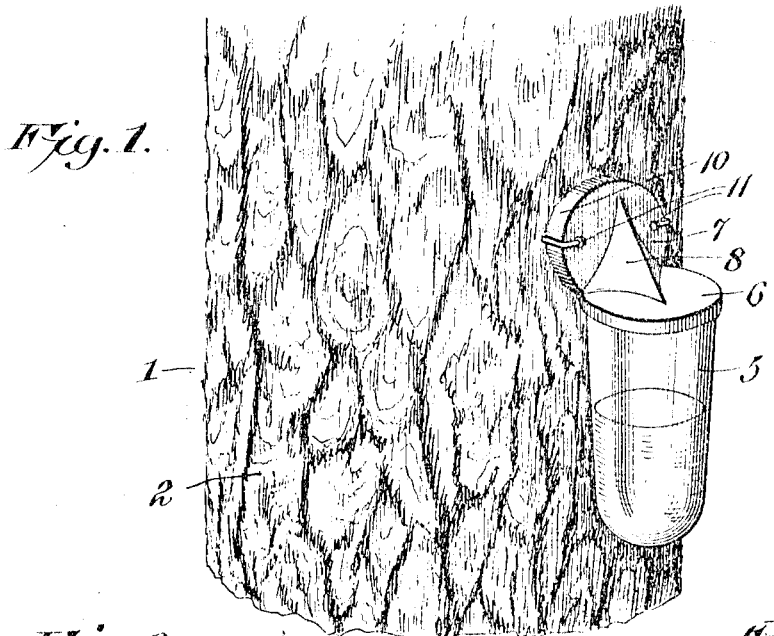
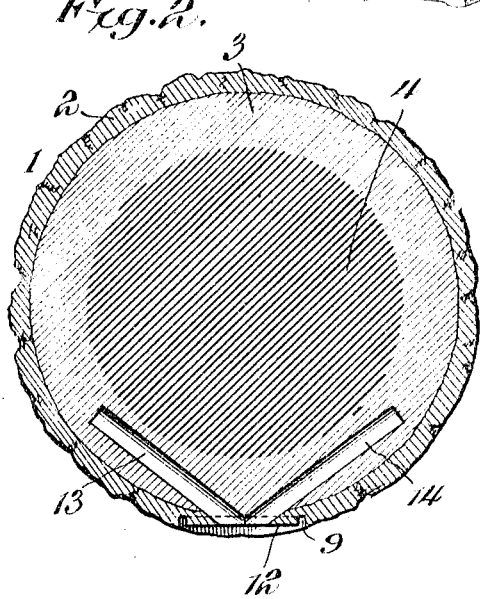
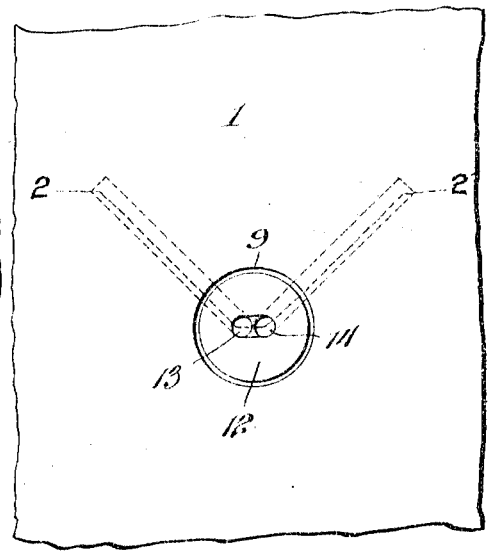
John T. Gilmer, INVENTOR,
WITNESSES

UNITED STATES PATENT OFFICE.

JOHN T. GILMER, OF MOBILE, ALABAMA.

METHOD OF TREATING TREES FOR EXTRACTING SAP.

1,012,541.  Specification of Letters Patent.  Patented Dec. 19, 1911.

Application filed November 19, 1910. Serial No. 593,285.

*To all whom it may concern:*

Be it known that I, JOHN T. GILMER, a citizen of the United States, residing at Mobile, in the county of Mobile and State of Alabama, have invented a new and useful Method of Treating Trees for Extracting Sap, of which the following is a specification.

This invention has reference to improvements in a method of collecting turpentine, but is equally applicable to the collecting of sap of other kinds, and its object is to provide for a copious flow of sap without injury to the tree and without waste of the sap.

By the present invention a large number of sap ducts may be tapped without exposing the sap wood to atmospheric effects, and to this end the invention consists in first forming a seat in the bark of the tree without removing the bark except the superficial layers, so that the harder bark layers are exposed, the seat being designed to receive a cover member by which sap may be directed to a suitable container, the device shown in Letters-Patent No. 961,953, for sap or gum extractor, granted to me on June 21, 1910, being well adapted for the purpose. After forming a suitable seat for the cap member of the present invention, passages are formed in the sap wood in divergent relation one to the other and inclining upwardly into the sap wood from a point approximately central to the seat formed in the bark, care being taken that the direction of the passages shall be such that they remain wholly within the sap wood and do not reach the heart of the tree. The seat for the cap adapted to be attached to the tree and to which the collecting cup is fastened, may be formed by a suitable auger, while the passages leading from the center of this seat into the sap wood may be formed by an auger bit of suitably small size capable of cutting holes into the tree in traversing relation to the sap ducts and at a suitable inclination to the horizontal, so that sap flowing from the ruptured ducts into the passages will gravitate down the same to the outlet ends and be caught by the cap member and directed into the container or cup designed to receive the sap.

The invention will be best understood from a consideration of the following detailed description, taken in connection with the accompanying drawings forming a part of this specification, with the understanding, however, that the invention is not necessarily limited to the exact procedure set forth, but may be varied within such limits as shall not constitute a departure from the salient features of the invention.

In the drawings:—Figure 1 is a perspective view of the exterior of a tree with a collecting cup attached thereto. Fig. 2 is a section on the line 2—2 of Fig. 3. Fig. 3 is an outline view of a portion of a tree after having been prepared in accordance with the present invention.

Referring to the drawings, there is shown a portion 1 of a tree trunk, and since for convenience of description, but without limitation of the invention to the particular use, the application of the invention may be considered with relation to the collection of turpentine, the portion 1 of the tree will be considered as illustrating a portion of a pine tree from which a sap known as turpentine is collected. The tree may be generally considered as composed of an outer bark layer 2, a sap zone 3, and a heart zone 4, the sap zone being intermediate of the heart zone and the bark. In most of the trees from which turpentine is gathered the sap zone or sap wood will approximate two inches in thickness.

In carrying out the invention it is assumed that the collecting devices shown in the aforesaid Letters-Patent are to be used, but this does not preclude the use of other collecting devices capable of application to the tree without disturbing the deeper layers of the bark. The collecting device comprises a cup 5 with a cover 6 to which is secured a cap member 7 designed to be applied to the tree, and this cover 6 and cap 7 are connected by an intermediate coupling portion 8, which as disclosed in said Letters-Patent also constitute a duct for directing the turpentine to the cup 5 without exposure to the atmosphere.

In carrying out the invention, there is first formed in the bark of the tree an annular groove 9, this conforming to the size of the cap member 7, so that an annular flange 10 formed on this cap member will snugly fit into the groove 9 and the cap member is then secured to the tree by nails 11 driven thereinto and bent over the cap member, or by any other means suitable for the purpose. An ordinary auger may be used for producing the groove 9 for the scoring lips of the auger will produce a circular groove suitable for the reception of the flange 10, while if this groove is carried deep enough the cutters of the auger will trim off the bark flat, as shown at 12, Fig. 2, to any desired depth, but usually the bark is thick enough so that the groove 9 need not extend entirely through the bark, but only into the denser layers thereof. The operator now takes a bit of proper size, say a three-quarter inch bit, although the size is not mandatory, and by holding the bit at a suitable angle there is bored into the sap wood 3 from approximately the center of the space inclosed by the groove 9, a passage 13 at an angle to the radius of the tree and inclining in an upward direction, the angle being such that the passage is wholly within the sap wood 3 and if made long enough would ultimately pass through the bark of the tree at a distant point, but at no time reaching the heart of the tree. After producing one passage, another like passage 14 is produced, but in divergent relation to the first named passage, the two passages being in meeting relation at about the center of the zone circumscribed by the groove 9, whereby a single opening is formed at the outer ends of the passages, which opening is of less diameter than the combined diameters of both passages. The passages 13 and 14 will traverse many sap ducts and sap escaping from such ducts into the passages will gravitate along these passages to the outer ends thereof and discharge into the cap 7 to be ultimately directed by the connecting piece 8 through the cover 9 and into the cup 5, the sap at no time being exposed to the atmosphere and consequently is not subject to loss by evaporation. The passages 13 and 14, while small, will traverse many sap ducts and consequently the yield of the tree will be commensurately rapid. The upward inclination of the passages permits longer passages to be bored in the sap area of the tree, than if they were on a horizontal plane, resulting in the passages traversing a greater number of the sap ducts which run vertically of the tree. The inclination has the further advantage of causing the sap to flow by gravity down the passages to the outlet ends thereof. At the same time there is no necessity of removing any of the bark of the tree as occurs with the ordinary practice of scarification, nor is there any loss due to oxidation of the sap on flowing over such scarified surfaces, or injury to the wood due to the exposure of the sap wood to the atmosphere, or injury to the tree due to the presence of boxes formed in the wood of the tree to catch the turpentine, and when the collecting devices are finally removed, the holes are too small to constitute a source of injury to the tree, and inclining upwardly will not catch and retain rain water. Since both passages have their outlet ends opening out at the bark layer of the tree, it follows that when the collecting device is removed, the bark which grows faster than the rest of the tree will soon grow over the holes and close them completely. The removal of the superficial layers of the bark within the zone described by the groove 9 is not in the least harmful to the tree and sufficient bark still remains to protect the sap wood from the effects of the atmosphere after the cap 7 has been removed. The sap or turpentine thus obtained is of the purest quality and free from all extraneous matters. The yield is also large, because there is no loss from evaporation, and the tree is neither weakened, as in the case of the formation of boxes to catch the turpentine, nor is there liability of injury to the tree from fires, which in the case of boxed trees attack the accumulated rosin in the boxes and often cause such injury to the trees as to either kill them outright or by weakening the tree close to the roots contribute to the destruction of the tree from wind storms.

The passages 13 and 14 may be made sufficiently long to cut as many sap ducts as are cut in the preparation of the trees by scarifying, but without exposure of the sap wood to the atmosphere.

The advantages of this method will be best understood by referring to my previous patents, 858,380, dated July 2, 1907, and 907,778, dated Dec. 29, 1908. In the first patent there is shown a hole which is bored horizontally into the tree for a depth of two-and-a-half to three-and-a-half inches, and having a diameter between two to three-and-a-half inches. In the second patent, there is shown a plurality of holes arranged side by side and extending horizontally into the tree. In the first instance, the hole is of such diameter as to collect water and sap after the removal of the sap collecting device, which would cause the breeding of worms that are very destructive to a pine forest. While in the second patent this objection would be minimized to some extent, still the horizontal arrangement of the holes or passages would limit the length thereof, for, if carried beyond two inches, the heart of the tree would be penetrated. From a consideration of the above, the importance of the angular relation of the two passages and their upward inclination as distinguishing this invention from my previous patents will be manifest, and, since the advantages have been fully pointed out, it is unnecessary to repeat them here.

What is claimed is:—

The method of treating trees for extracting sap therefrom, which consists in first producing a seat for a sap collecting device by forming in the tree an annular groove, which groove is of a less depth than the thickness of the bark layer of the tree, then boring through the bark and through the sap wood only of the tree, two narrow upwardly inclined passages, which lead from within the space defined by the said groove and are arranged at an angle to each other, said passages having a combined diameter considerably less than the diameter of the groove and having their outer ends in juxtaposition, whereby upon the removal of the sap collecting device from the tree, the outer ends of the passages will be closed by the growth of the bark layer over the same.

In testimony, that I claim the foregoing as my own, I have hereto affixed my signature in the presence of two witnesses.

JOHN T. GILMER.

Witnesses:
JOHN W. MCALPINE,
J. H. WEBB.